United States Patent
Olason et al.

(10) Patent No.: US 9,352,538 B1
(45) Date of Patent: May 31, 2016

(54) COMPOSITE MATERIAL STRUCTURE AND METHOD OF MANUFACTURING SAME

(71) Applicant: Park Electrochemical Corporation, Melville, NY (US)

(72) Inventors: Eric L. Olason, Seattle, WA (US); Gregory D. Strand, Edmonds, WA (US); David R. Dahlquist, Massapequa, NY (US)

(73) Assignee: Park Electrochemical Corporation, Melville, NY (US)

( * ) Notice: Subject to any disclaimer, the term of this patent is extended or adjusted under 35 U.S.C. 154(b) by 0 days.

(21) Appl. No.: 14/453,417

(22) Filed: Aug. 6, 2014

Related U.S. Application Data

(62) Division of application No. 12/980,641, filed on Dec. 29, 2010, now abandoned.

(51) Int. Cl.
*B32B 37/00* (2006.01)
*B29C 53/56* (2006.01)
*B32B 37/14* (2006.01)
*B32B 38/00* (2006.01)
*B29C 53/58* (2006.01)

(52) U.S. Cl.
CPC .............. *B32B 37/142* (2013.01); *B32B 37/144* (2013.01); *B32B 38/0036* (2013.01); *B29C 53/562* (2013.01); *B29C 53/585* (2013.01); *B29C 53/586* (2013.01); *B32B 2038/0076* (2013.01); *B32B 2305/076* (2013.01); *B32B 2307/54* (2013.01)

(58) Field of Classification Search
CPC .... B29C 53/562; B29C 53/585; B29C 53/586
USPC ........ 156/184, 185, 187–192; 242/439–447.3
See application file for complete search history.

(56) References Cited

U.S. PATENT DOCUMENTS

| | | | | |
|---|---|---|---|---|
| 3,673,029 | A * | 6/1972 | McLarty | 156/175 |
| 5,160,392 | A | 11/1992 | Thongs, Jr. | |
| 5,192,384 | A * | 3/1993 | Barrier et al. | 156/189 |
| 6,261,500 | B1 * | 7/2001 | Park et al. | 264/258 |
| 6,379,763 | B1 * | 4/2002 | Fillman | 428/36.9 |
| 8,328,138 | B2 * | 12/2012 | Bergmann et al. | 244/131 |
| 2008/0129041 | A1 | 6/2008 | Allen et al. | |

* cited by examiner

*Primary Examiner* — Carson Gross
(74) *Attorney, Agent, or Firm* — Fish & Richardson P.C.

(57) ABSTRACT

A method of manufacturing a composite material structure, such as a strut, includes providing a rigid, elongate, substantially tubular member and coupling a first end fitting to a first axial end of the substantially tubular member. The first end fitting has an undulated outer surface with one or more alternating, annular crests and grooves that extend longitudinally along the first end fitting. The method includes rolling a sheet of pre-impregnated composite fiber around the substantially tubular member one or more times such that the sheet covers the substantially tubular element and extends at least partially over the undulations of the first end fitting. The method includes curing the pre-impregnated composite fibers in the rolled sheet.

15 Claims, 11 Drawing Sheets

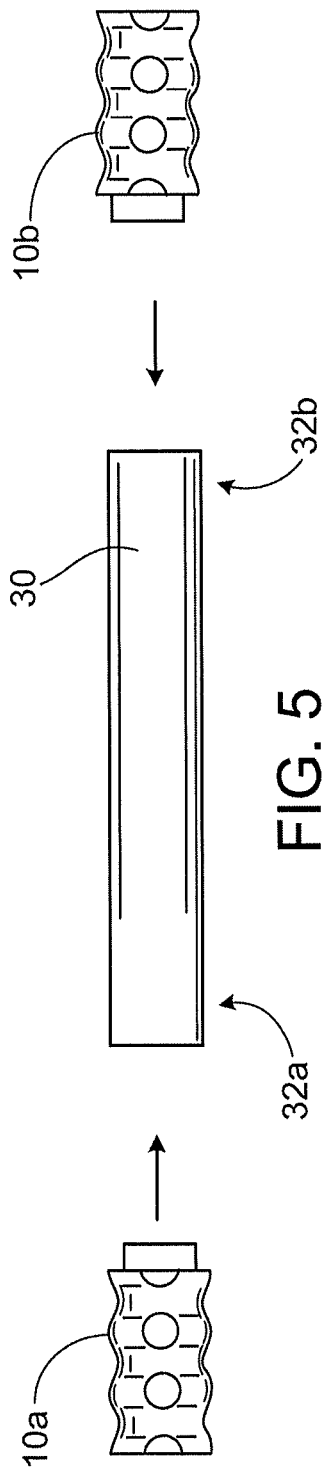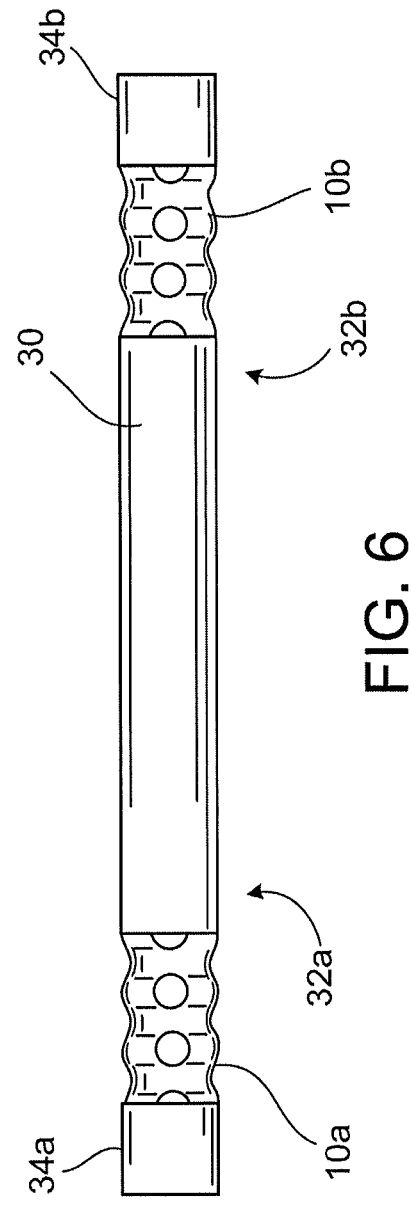

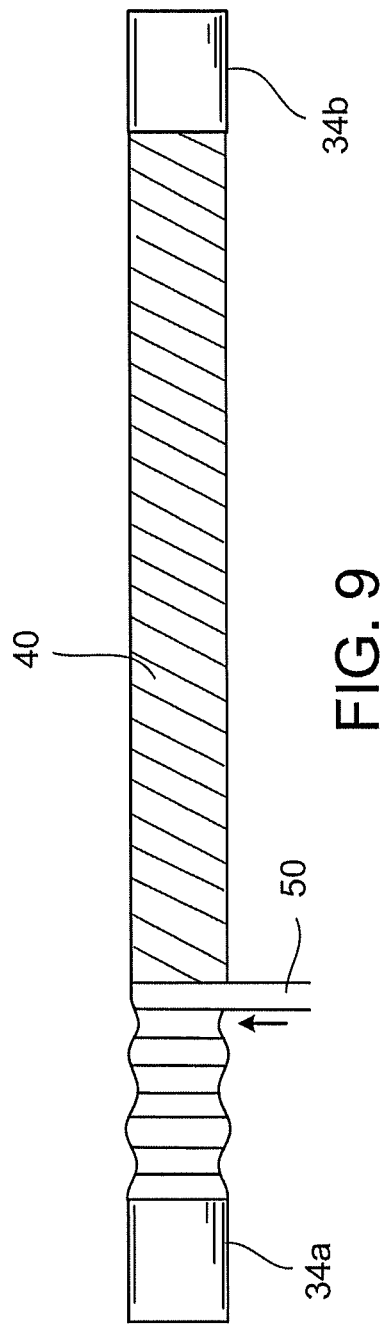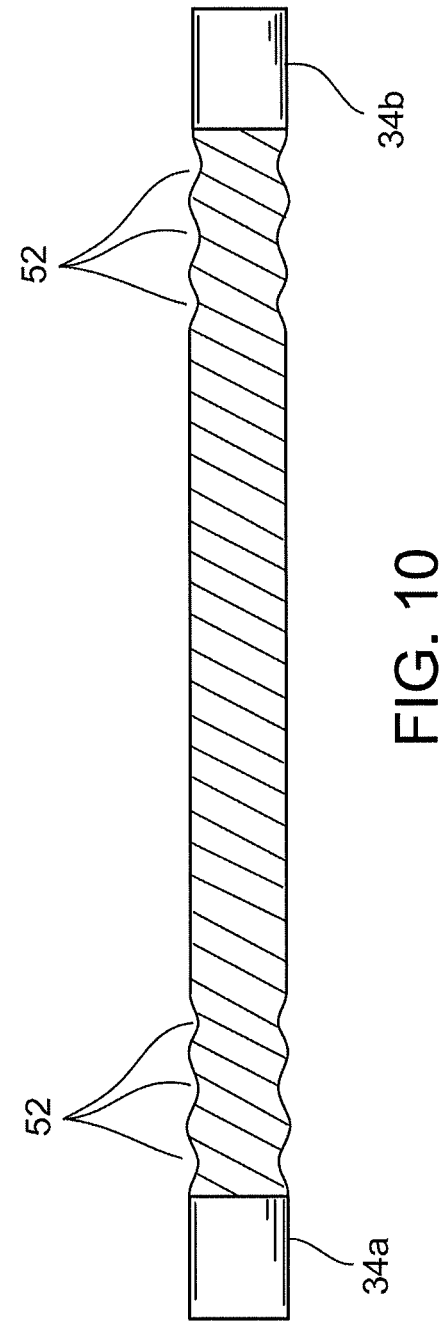

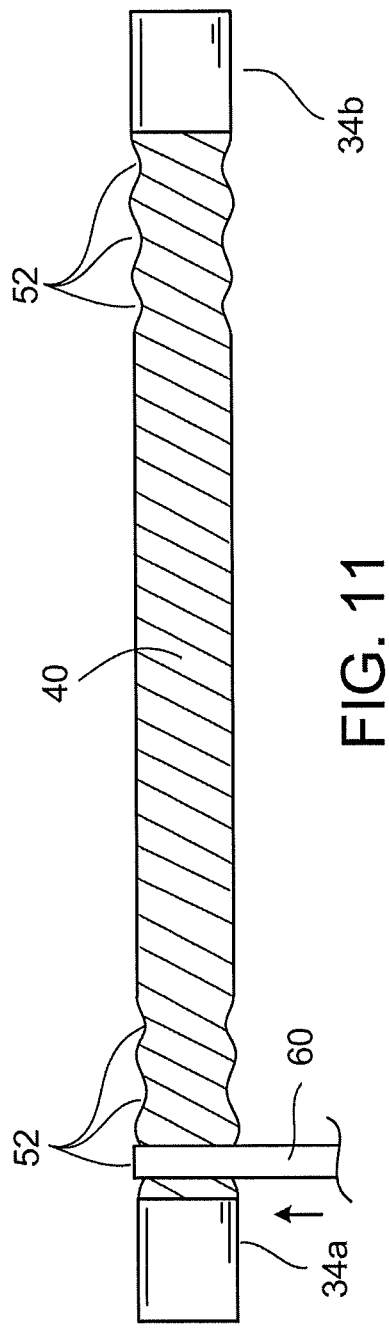
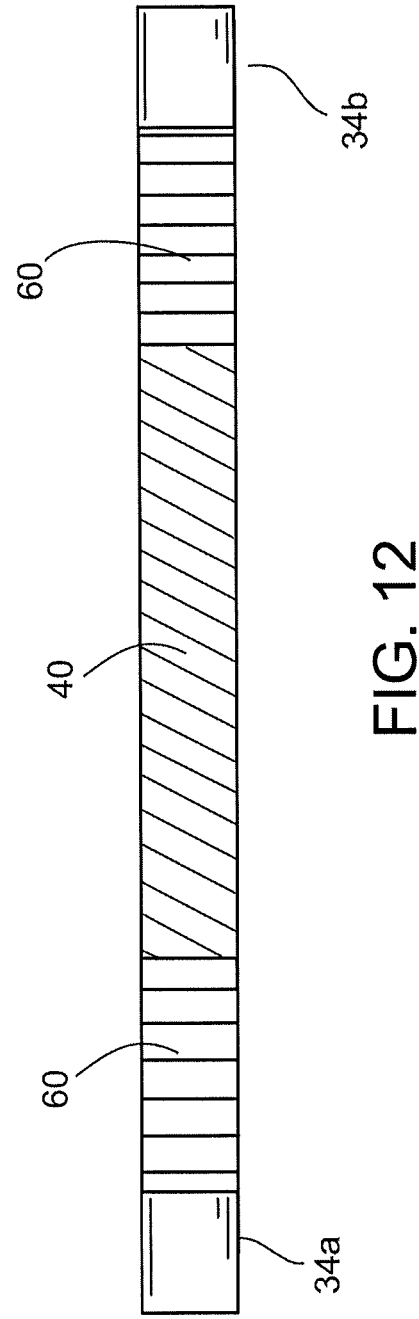
FIG. 11
FIG. 12

COMPOSITE MATERIAL STRUCTURE AND METHOD OF MANUFACTURING SAME

FIELD OF THE INVENTION

The present application relates to a composite material structure, such as a strut, and a method of manufacturing the composite material structure.

BACKGROUND

Composite materials are used to manufacture a wide variety of structures, especially where a high strength-to-weight ratio is desired. In general, composite materials (or simply "composites") are materials in which fibers (usually formed of a high tensile strength material) are imbedded in a resin matrix. Some examples of composite materials include glass fiber-resin composites and graphite fiber-resin composites, the latter being particularly noted for high strength and light weight. Such materials are available from a large number of manufacturers, one example being Hexcel Corporation of Pleasanton, Calif., USA.

SUMMARY OF THE INVENTION

In one aspect, a method of manufacturing a composite material structure, such as a strut, includes providing a rigid, elongate, substantially tubular member and at least coupling a first end fitting to a first axial end of the substantially tubular member. The first end fitting has an undulated outer surface with one or more alternating, annular crests and grooves that extend longitudinally along the first end fitting. The method includes rolling a sheet of composite material (e.g., pre-impregnated composite fiber) around the substantially tubular member one or more times such that the sheet covers the substantially tubular element and extends at least partially, and in some instances entirely, over the undulations of the first end fitting. In some implementations, the sheet is rolled over the substantially tubular member and the entire end fitting such that the sheet extends beyond the end fitting and at least partially onto a collar that is coupled to the end fitting. The method includes curing the pre-impregnated composite fibers in the rolled sheet.

In a typical implementation, the outer diameter of each crest is greater than the outer diameter of each groove. The alternating crests and grooves can form a substantially smooth outer surface (e.g., one that follows a substantially sinusoidal path) or a surface that has a sharp corner between each crest and groove. For example, the one or more crests and grooves can form a square wave pattern, a triangle wave pattern or a saw tooth pattern. Alternatively, the one or more crests and grooves can form a substantially triangle-shaped wave pattern, with the top of each crest and the bottom of each groove being rounded slightly.

In some implementations, having a smoother outer surface can reduce the amount of tearing that the pre-impregnated composite fibers experience when being applied to the undulated portion of the end fitting or in service.

As discussed below, a typical embodiment includes an end fitting at each end of the substantially tubular member. In such instances, the end fittings usually are substantially similar to each other.

In another aspect, composite material structure, such as a strut, includes a rigid, non-fluidizable, elongate, substantially tubular member and a first end fitting coupled to a first axial end of the substantially tubular member. The first end fitting has an undulated outer surface with one or more alternating, annular crests and grooves that extend longitudinally along the first end fitting. A fiber-resin matrix covers the substantially tubular member and at least part of the undulations on the first end fitting to hold the fiber-resin matrix in engagement with the undulations of the first end fitting.

In some implementations, the method includes urging the rolled sheet into one or more grooves in the undulated outer surface of the first end fitting. Moreover, in some implementations, urging the rolled sheet into the one or more grooves includes applying tape to one or more portions of the rolled sheet at locations that correspond to the one or more grooves defined by the undulations of the first end fitting.

In a typical embodiment, before curing the pre-impregnated composite fibers, the tape is removed from the rolled sheet to reveal one or more depressions in an outer surface of the rolled sheet at locations in the rolled sheet that correspond to one or more of the grooves beneath the rolled sheet. Then, one or more strips of composite material is applied over the rolled sheet to at least partially cover the one or more depressions and a shrink tape is applied over the strips of composite material and over the portions of the rolled sheet that are not covered by the one or more strips.

According to some embodiments, the method includes removing the shrink tape after curing the composite material. Curing the composite material typically includes applying heat to the composite material. Curing also generally involves the application of pressure, which is typically applied by the shrink tape.

Certain implementations include, before applying the heat, coupling a second end fitting to a second axial end of the substantially tubular member opposite the first axial end. The second end fitting can be similar to the first end fitting and have an undulated outer surface with one or more crests and one or more grooves arranged in an alternating manner. The crests and grooves in the undulated outer surface of the second end fitting extend longitudinally along the second end fitting. Typically, rolling the sheet onto the substantially tubular member is done in such a manner that the sheet extends at least partially over the undulated outer surface of the second end fitting. Moreover, the method also can include urging the rolled sheet into one or more of the grooves in the undulated outer surface of the second end fitting.

In some embodiments, urging the rolled sheet into the one or more grooves of the second end fitting includes applying tape over at least a portion of the rolled sheet to urge the rolled sheet into the one or more grooves defined by the undulated outer surface of the second end fitting. Each of the first and second end fittings can include a substantially cylindrical body and each undulated outer surface can have multiple substantially annular crests and grooves which extend around the substantially cylindrical body.

In a typical implementation, the sheet of composite material is at least wide enough to cover the entire substantially tubular member and portions of the undulated outer surfaces of the first and second end fittings, respectively.

The substantially tubular member typically has a first axial opening at the first axial end of the substantially tubular member and a second axial opening at the second axial end of the substantially tubular member. The method includes forming (or having formed) a first extended shoulder on the first end fitting and a second extended shoulder on the second end fitting. The first and second extended shoulders typically are sized to fit snugly into the first and second axial openings, respectively. In these instances, coupling the first end fitting to the first axial end of the substantially tubular member includes inserting the extended shoulder into the first axial opening, and coupling the second end fitting to the second axial end of the substantially tubular member includes inserting the second extended shoulder into the second axial opening.

In certain implementations the substantially tubular member is a non-fluidizable material, such as a fiber-reinforced polymer material.

The method typically includes adhering the sheet to the substantially tubular element prior to rolling the sheet of composite material onto the substantially tubular member.

In some embodiments, the sheet of composite material has lengthwise fibers which extend longitudinally over the end fitting when the sheet has been rolled onto the substantially tubular member and at least partially over the undulated outer surface of the first end fitting so as to transmit loads to and from the fitting and/or crosswise fibers which extend around the end fitting when the sheet has been rolled-onto the substantially tubular member and at least partially over the undulations of the first end fitting so as to hold the lengthwise fibers in engagement with the undulated outer surface of the end fitting.

The composite material can be a pre-impregnated composite fiber, for example. The resulting composite material structure is typically a strut.

In another aspect, a method of manufacturing a composite material structure, such as a strut, includes: providing a rigid, non-fluidizable, elongate, substantially tubular member; coupling a first end fitting to a first axial end of the substantially tubular member, the first end fitting having an undulated outer surface with one or more crests and one or more grooves arranged in an alternating manner, the undulated outer surface extending longitudinally along the first end fitting; rolling a sheet of composite material around the substantially tubular member so that the sheet covers the substantially tubular elements and extends at least partially over the undulated outer surface of the first end fitting; and curing the composite material in the rolled sheet.

In yet another aspect, a composite material structure includes a rigid, non-fluidizable, elongate, substantially tubular member and a first end fitting coupled to a first axial end of the substantially tubular member. The first end fitting has an outer surface with annular crests and grooves arranged in an alternating manner longitudinally along the first end fitting. A fiber-resin matrix is formed covering the substantially tubular member and at least part of the crests and grooves on the first end fitting to hold the fiber-resin matrix in engagement with the first end fitting.

In some implementations, the fiber resin matrix has lengthwise fibers which extend longitudinally over the end fitting so as to transmit loads to and from the end fitting and/or crosswise fibers which extend around the end fitting so as to hold the lengthwise fibers in engagement with the end fitting.

Certain embodiments include multiple annular crests and grooves that extend around a cylindrical body of the first end fitting.

The composite material structure can include a mounting portion with means for threadingly mounting the end fitting to an external structure so that loads are transferred to or from the external structure to or from the end fitting in an axial direction.

Some implementations have a second end fitting coupled to a second axial end of the substantially tubular member, opposite the first axial end. The second end fitting can be, for example, very similar or identical to the first end fitting. In some implementations, the second end fitting has an undulated outer surface with one or more crests and one or more grooves arranged in an alternating manner. The undulated outer surface extends longitudinally along the second end fitting. The fiber-resin matrix typically covers at least part of the undulated outer surface of the second end fitting to hold the fiber-resin matrix in engagement with the undulations of the second end fitting.

The first and second end fittings typically are in coaxial alignment with one another.

The composite material structure typically has a first axial opening at the first axial end of the substantially tubular member and a second axial opening at the second axial end of the substantially tubular member. In some instances, each of the first and second end fittings has an extended shoulder portion that engaged snugly into a respective one of the first or second axial openings.

According to certain implementations, the composite material structure has at least one flat formed on a longitudinal side of the first end fitting for engaging the fiber-resin matrix so as to prevent the first end fitting from turning therein in response to application of torque to the end fitting.

The substantially tubular member can include, for example, fiber-reinforced polymer.

In some implementations, one or more of the following advantages are present.

For example, a non-labor-intensive, highly precise, adaptable manufacturing process for a strut with one or more end fittings is disclosed. The techniques are easily adaptable to produce a wide variety of struts with different load carrying capabilities, lengths and outer diameters. Manufacturing time, complexity and cost is low, while providing a robust strut design. Additionally, the substantially tubular element, which can be fiberglass, for example, typically enhances column stability and load capacity of the strut.

Other features and advantages will be apparent from the description and drawings, and from the claims.

BRIEF DESCRIPTION OF THE DRAWINGS

FIGS. 5-15 are a series of views showing an exemplary sequence of steps in manufacturing a composite material structure that includes an end fitting.

Like reference numerals refer to like elements.

DETAILED DESCRIPTION

Figure 1:
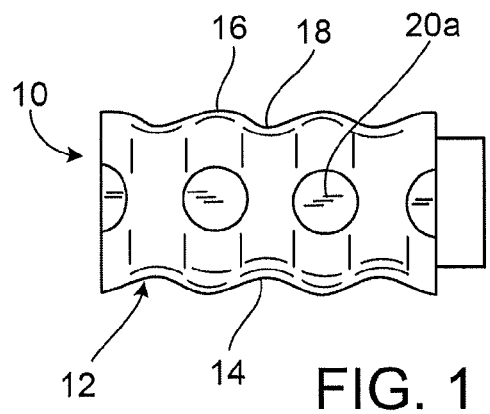
FIG. 1 is an elevation view of an end fitting.
Figure 2:
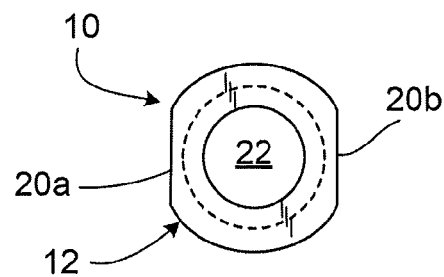
FIG. 2 is an end view of the end fitting of FIG. 1.
Figure 3:
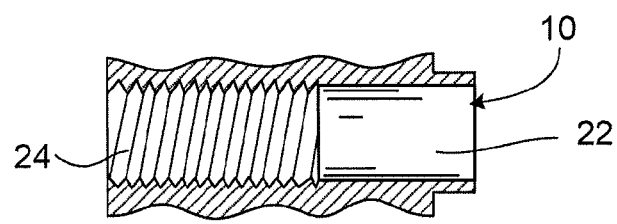
FIG. 3 is an elevation view of a longitudinal cross-section taken through the end fitting of FIG. 1.

FIGS. 1-3 show an embodiment of end fitting 10 that can be incorporated into a composite material structure, such as a strut, and arranged so as to transfer generally axial loads to and from a fiber/resin matrix portion of the composite material structure.

The illustrated end fitting 10 includes a generally cylindrical body 12, which in a typical embodiment is metal, such as titanium, steel or aluminum. The generally cylindrical body 12 has an undulated surface 14 which defines a plurality of alternating crests and grooves 16, 18.

In the illustrated embodiment, each annular crest has a first and second flat 20*a*, 20*b* on generally opposite sides thereof, so that a series of flats extends along each side of the cylindrical body so as to prevent the fitting from turning within the fiber-resin matrix when torque is applied thereto.

The end fitting 10 also includes an axial bore 22 having internal threads 24 over at least a part of its length. The threaded bore is configured to receive the end of a bolt or threaded rod for attachment to another component, such as another strut or a panel, for example. In some embodiments, the fitting may have an axially-extending stud, with or without threads, or other form of coupling in addition to or in place of the threads in the bore for attachment to the adjacent component. Moreover, in some embodiments, the end fitting 10 may be formed of a non-metallic material, such as high-strength plastic or ceramic material, for example.

In a typical implementation, as discussed below in detail, the end fitting 10 becomes embedded in a fiber-resin matrix so that the annular crests/grooves are engaged by the surrounding fiber-resin matrix. This forms an extremely strong engagement between the end fitting 10 and the fiber-resin matrix without requiring an adhesive, and also ensures effective transfer of axial loads into and out of the fiber-resin matrix.

The illustrated end fitting 10 has an extended shoulder 26 at one axial end thereof. Like the rest of the end fitting 10, the extended shoulder 26 has a hollowed-out opening that extends axially through it. The outer diameter of the extended shoulder is smaller than the outer diameter of the other sections of the end fitting and, as discussed below, is sized to fit snugly within the opening in the end of a substantially tubular member.

Figure 4:
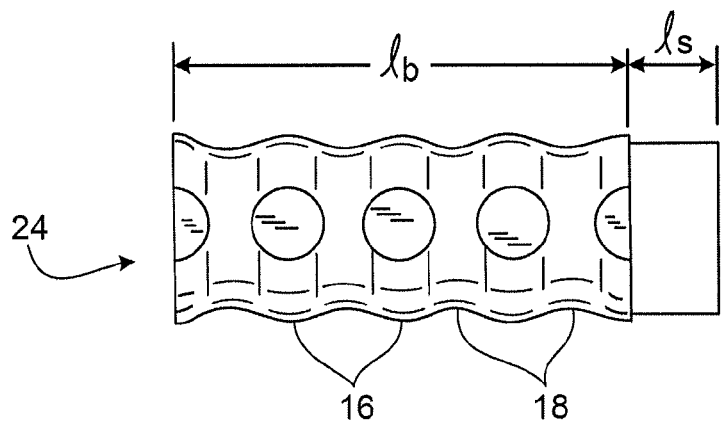
FIG. 4 is an elevation view of a second end fitting.

The length of the body portion of an end fitting (e.g., "$l_b$" in FIG. 4) can be increased or decreased depending, for example, on the axial loads that the strut are expected to experience. This change in length can be done with or without also changing the diameter of the cylindrical body. For example, the end fitting 24 which is shown in FIG. 4 has the same overall configuration as the fitting 10 in FIG. 1, except that the increased length of its body portion provides it with one more set of crests and grooves 16, 18 with which to engage a surrounding fiber-resin matrix, thereby distributing the load more evenly.

Similarly, the length of the extended shoulder of an end fitting ("$l_s$" in FIG. 4) can be increased or decreased. In a typical implementation, increasing the length of an extended shoulder in an end fitting can help prevent the end fitting from "rocking out" of the opening in the substantially tubular member during manufacturing processes. Additionally, in some embodiments, increasing the length of the extended shoulder provides a greater degree of axial alignment between the end fitting and the substantially tubular element to which the end fitting is eventually attached.

As will also be described in greater detail below, during fabrication of the strut, the fiber-resin layers are pressed into engagement with the end fitting so that the longitudinal fibers closely follow the crests/grooves thereon. In this respect, the smooth, generally sinusoidal undulations of the fitting have been found to allow a very close fit, without forcing the fibers to bend through excessively sharp angles which could, at least potentially, cause a breakage of fibers and/or reduction of strength. The actual height and width of the crests and grooves will vary somewhat according to the qualities of the materials used in the fiber-resin matrix and the design requirements of the structure (e.g., larger structures will generally require larger crests/grooves, due in part to the larger number of fiber/resin layers used to form the walls of such structures), some implementations include a somewhat shallow sinusoidal curve, with a curve having an approximate 5:2 width-to-height ratio and about a 21.8° ramp angle. Such implementations are suitable for use with commonly available carbon fiber-resin materials such as those described below.

FIGS. 5-14 illustrate a sequence of steps in constructing an exemplary strut using an end fitting, such as the end fitting in FIGS. 1-3.

The strut produced by the illustrated sequence of steps is an elongate structure having first and second identical, axially aligned attachment fittings at each end, through which loads are transmitted to or from one or both ends of the strut. In various implementations, various attachment fittings may be used. Moreover, while the exemplary embodiment which is shown in the figures employs a carbon fiber-resin matrix material, other suitable types of fibers and resin materials, such as glass, Kevlar, UHMWPE or liquid crystal fibers, can be used, for example. Other possible matrix materials include thermosetting resin, epoxy resin, phenolic resin, cyanate ester and bismaleimide (BMI).

As shown in FIG. 5, the illustrated method includes providing a rigid, elongate, substantially tubular member 30 with a first axial end 32a and a second axial end 32b and a pair of end fittings, including first end fitting 10a and second end fitting 10b. The substantially tubular member 30 is a non-fluidizable material. In general, non-fluidizable material refers to any material that resists conversion from a static solid or solid-like state to a fluid-like state. Non-fluidizable materials generally maintain their structural integrity even when exposed to fluid (i.e., liquid or gas) flow by the non-fluidizable material. Exemplary materials suitable for the substantially tubular member include fiber-reinforced polymer materials, such as fiberglass.

In a typical implementation, the substantially tubular member 30 defines an internal axial passage that extends through the entire length of the substantially tubular member 30 and opens at each axial end thereof. The openings typically have an inner diameter sized to receive and frictionally engage the extended shoulder portions of the end fittings 10a and 10b. There typically is a snug fit between the shoulder portions of the end fittings and the openings in the substantially tubular members.

FIG. 6 shows the first end fitting 10a moved into engagement with the first axial end 32a of the substantially tubular member 30 and the second end fitting 10b moved into engagement with the second axial end 32b of the substantially tubular member 30. In the illustrated implementation, engagement is enhanced by a snug friction fit between the extended shoulder portions of the first and second end fittings 10a, 10b and the axial openings at each end of the substantially tubular member 30. In some implementations, however, the degree of engagement between the first and second end fittings 10a, 10b and the substantially tubular member is enhanced by using an adhesive material therebetween.

In the illustrated embodiment, optional end collars 34a, 34b are attached to the end fittings 10a, 10b, respectively. The illustrated end collars 34a, 34b have substantially cylindrical body portions with outer diameters that are approximately the same as the outer dimensions of the widest part of the end fittings 10a, 10b. In some implementations, each end collar 34a, 34b is connected to one of the end fittings 10a, 10b by a threaded rod (not shown) that extends axially from the end fitting 10a, 10b to engage the internal threads 24 on the end fitting. Other methods of attachment are possible as well.

As discussed below, in some embodiments, attaching end collars 34a, 34b to the end fittings 10a, 10b, as shown in FIG. 6, allows sheet 40 to be laid up long, cured and subsequently ground back flush to 10a, 10b after removal. Moreover, in some implementations, this can help facilitate handling the substantially tubular member 30/end fitting 10*a*, 10*b* assembly during subsequent manufacturing steps.

Figure 7:
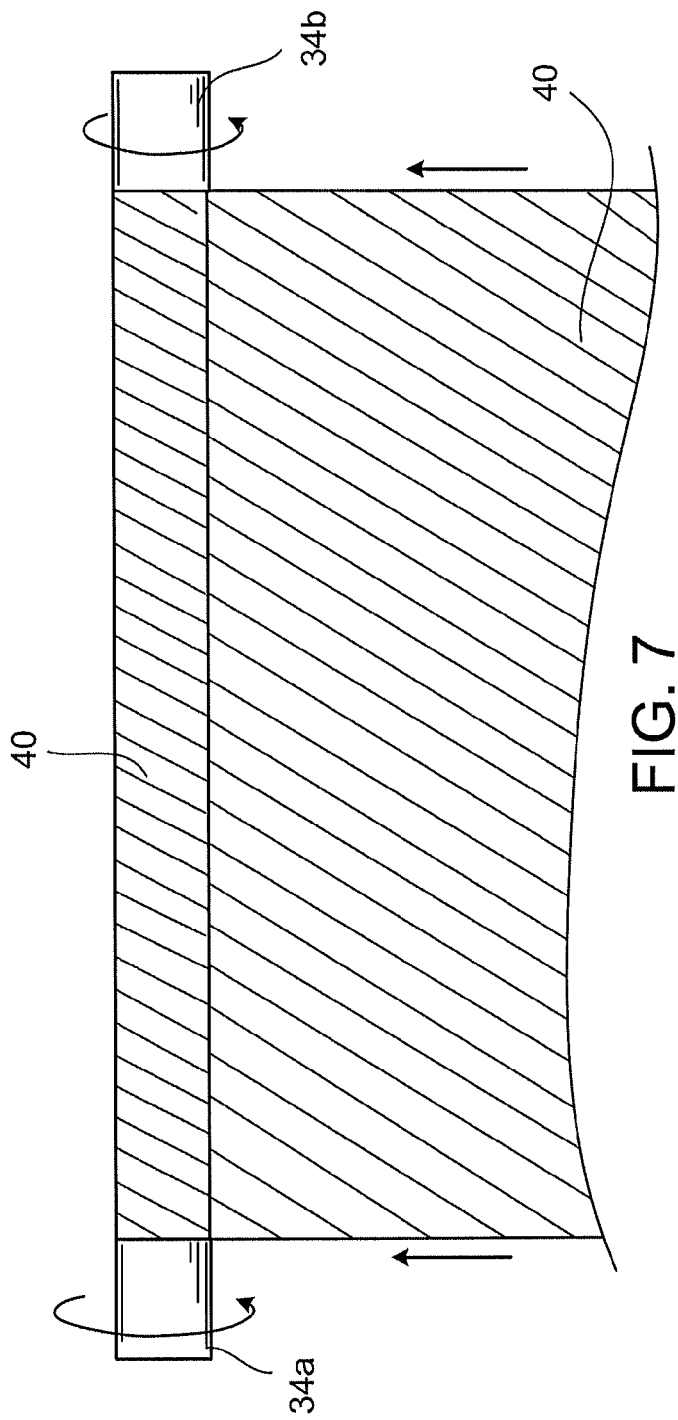

In FIG. 7, a sheet 40 that comprises pre-impregnated composite fiber (sometimes referred to as "prepreg") is shown being rolled onto the substantially tubular member 30/end fitting 10*a*, 10*b* assembly so that the sheet covers the entire substantially tubular member, both end fittings 10*a*, 10*b* and extends onto collars 34*a*, 34*b*. In the illustrated embodiment, the sheet 40 entirely covers both end fittings 10*a*, 10*b*. In some implementations, however, the sheet 40 only covers part of one or both end fittings 10*a*, 10*b*. When only part of one or more of the end fittings is covered, the sheet 40 will extend at least partially over that end fitting's undulations. The sheet 40 is wrapped around the substantially tubular member 30/end fitting 10*a*, 10*b* assembly at least one full time and, more typically, it goes around the assembly multiple times.

In the illustrated embodiment, the sheet extends a short distance over the end collars 34*a*, 34*b*, as well. However, small parts of the end collars are exposed beyond the edges on the sheet. These exposed parts of the end collars can be gripped by hand (or by a manufacturing machine) to rotate the substantially tubular member 30/end fitting 10*a*, 10*b* assembly while the sheet 40 is being applied to it.

In one preferred embodiment, the sheet has a width such that it will cover the entire length of the substantially tubular element 30 and extend at least partially over the undulations of both end fittings 10*a*, 10*b*. In a typical implementation, the sheet has a length such that it can be wrapped around the entire axial perimeter of the substantially tubular member and the undulations at least once and, preferably multiple times.

In one embodiment, the sheet 40 extends beyond the ends of the end fittings and partially onto the collars 34*a*, 34*b*.

In some implementations, an end of the sheet is adhered to the substantially tubular element 30 prior to being rolled onto the substantially tubular member 30. Additionally, in some implementations, the substantially tubular element is heated before rolling the sheet onto it. In general, these techniques have been found to help reduce slippage between the sheet and the substantially tubular member 30 when the sheet is being rolled.

Figure 8:
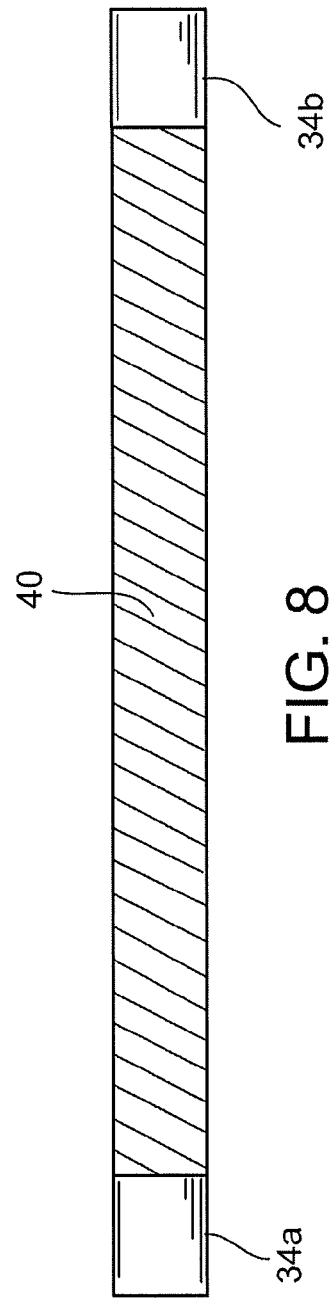

FIG. 8 shows the substantially tubular member 30/end fitting 10*a*, 10*b* assembly with the sheet 40 in place covering the substantially tubular member 30, the end fittings 10*a*, 10*b* and part of each end collar 34*a*, 34*b*.

FIG. 9 shows a technique to urge the rolled sheet 40 into one or more of the grooves defined by the undulations of the end fittings. According to the illustrated technique, the tape 50 is applied to an outer surface of the rolled sheet 40 at locations on the sheet that correspond to the undulations (i.e., grooves 14 and crests 16) in the end fittings 10. Typically, the tape 50 is applied with a sufficient amount of pressure to cause the portions of sheet 40 overlying the undulations of each end fitting 10*a*, 10*b* to conform roughly to the shape of the undulations.

After the sheet 40 is made to conform roughly to the shape of the undulations, the tape 50 is removed from those portions of the sheet 40 where the tape was applied. FIG. 10 shows the substantially tubular member 30/end fitting 10*a*, 10*b* assembly with the rolled sheet after the tape 50 has been removed. As shown, the portions of the rolled sheet 40 that correspond to the locations of the undulations on the end fittings conform roughly to the shape of the undulations. More particularly, the outer surface of the sheet is contoured to define three depressions 52 at near end of the sheet, with each depression 52 corresponding to a groove beneath it.

In a typical implementation, causing the sheet 40 to conform roughly to the undulated surface beneath the sheet 40 helps ensure close contact between the sheet and the undulations. This close contact helps ensure that the connection subsequently formed between the sheet material and the undulated surfaces will be strong when the sheet material is cured.

FIG. 11 shows a strip 60 of pre-impregnated composite fibers being applied over the rolled sheet 40 to at least partially cover the depressions 52 in the sheet at a first end of the assembly. In a typical implementation, a similar technique is applied to a second end of the assembly. This strip 60 typically has a width that makes it suitable to essentially fill-in each depression 52 without substantially increasing the outer diameter of the assembly in other non-depression areas of the sheet.

In a typical implementation, the strip 60 is long enough that it can be wrapped around the assembly a sufficient number of times to make the outer diameter of the assembly substantially uniform along its entire length. This typically depends on the thickness of the material being applied and the depth of the annular depressions that are to be filled-in. In some implementations, for example, a strip is wrapped around the assembly six times to even out the outer diameter of one of the annular depressions in the assembly.

FIG. 12 shows the assembly, after the strips 60 of pre-impregnated composite fibers have been applied over the rolled sheet 40 to cover the depressions (not visible in FIG. 12) at each end thereof. The resulting structure has a substantially constant outer diameter over its entire length. In a typical implementation, filling-in the depressions 52 with the strips of pre-impregnated composite fibers helps ensure that the strut produced by the illustrated process will have significantly enhanced structural properties.

Figure 13:
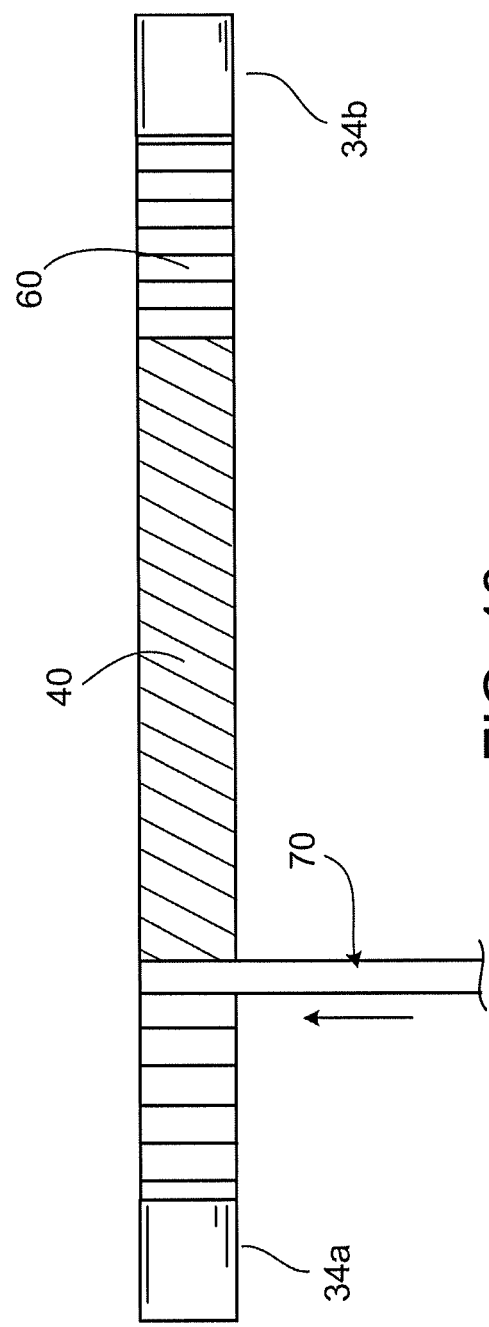

FIG. 13 shows a layer of shrink tape 70 being applied over the strips 60 of pre-impregnated composite fibers and over the central portions of the rolled sheet 40, which are not covered by the strips 60. In a typical implementation, the shrink tape is applied to cover substantially all of the of pre-impregnated composite fiber material in the assembly.

Figure 14:
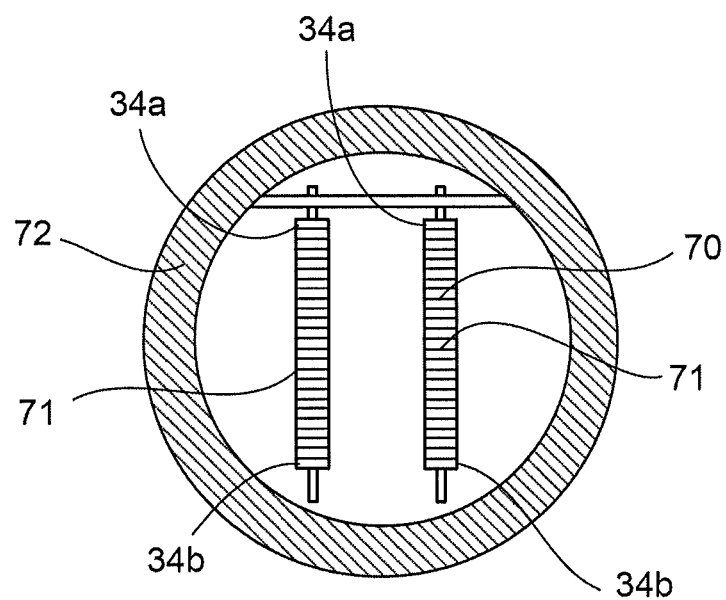

The completed assemblies 71 are placed in an oven or an autoclave 72 or other suitable heating apparatus for heating/curing of the resin material. As can be seen in FIG. 14, these assemblies can be heated and cured in a vertical orientation (i.e., with the long axis extending in a vertical direction), so as to minimize sagging of the material and to insure a more uniform finished cross-section. Heating is performed at temperature and time parameters which are specified by the manufacturer of the prepreg fiber-resin tape material. The cure time and temperature depend on the resin system being used, but generally fall within the range of 250° F.-400° F. and 120-360 minutes. While being heated, the resin components of the prepreg layers become molten, with the outer layer of shrink wrap tape maintaining the exterior configuration, preventing escape of the resin in its fluid state and consolidating plies of material into a homogenous laminate.

Figure 15:
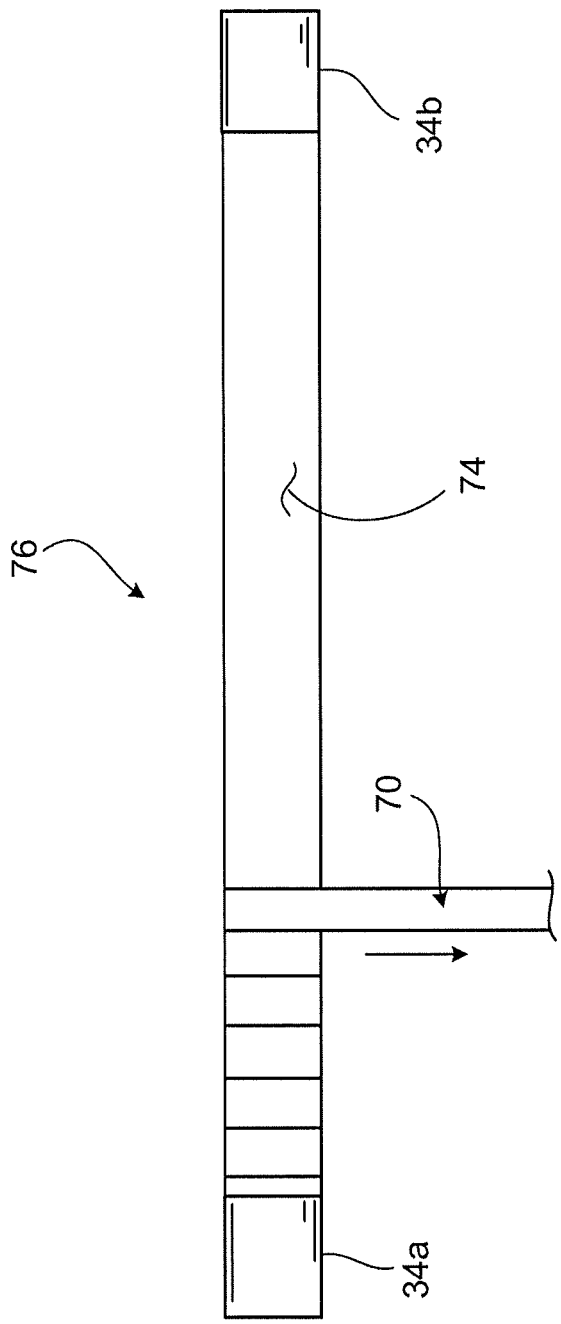
Figure 16:
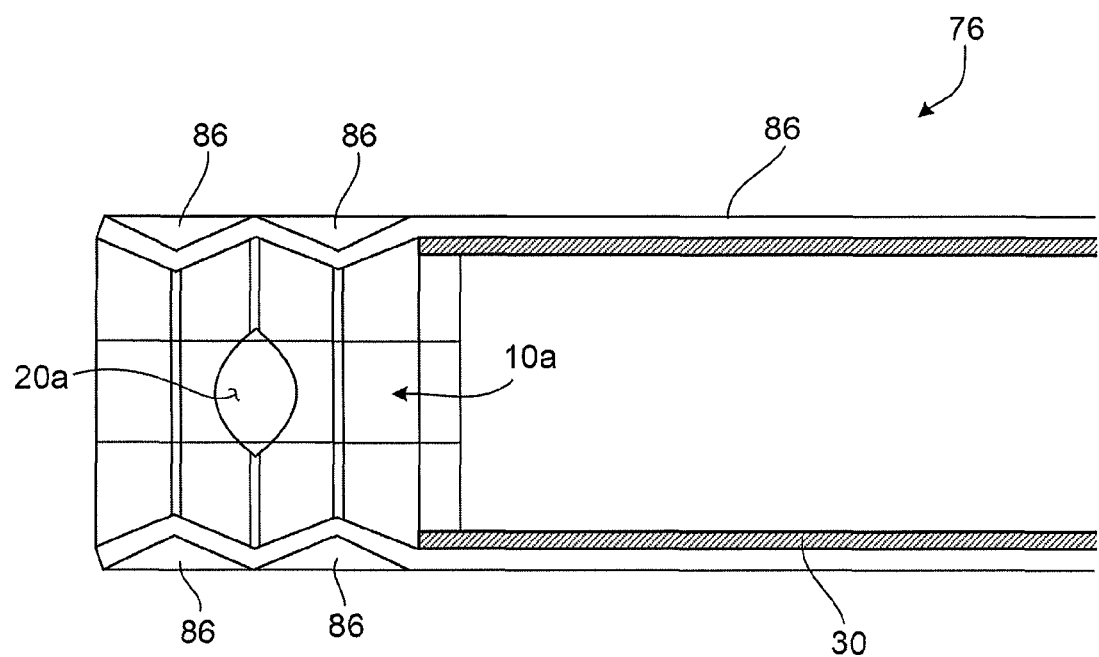
FIG. 16 is a side, cross-sectional view of one end of a composite material structure manufactured according to the manufacturing steps of FIGS. 5-15.

After a predetermined period of heating and subsequent cooling, the resin component cures to form a permanently rigid matrix that is bonded to the undulations of the end fittings 10*a*, 10*b*. The shrink wrap tape 70 is then unwound, as shown in FIG. 15, leaving the smooth external surface 74 of the cured strut 76. End collars 34*a*, 34*b* are then detached from the assembly. The ends of the composite layers are then trimmed flush with the end faces of the end fittings 10*a*, 10*b*.

FIG. 14 is a cross-sectional view of one end of the finished strut 76, primarily showing the relationship between the fiber-resin matrix and the undulated external surface 16 of the attachment fitting 10*a*. As can be seen, the fiber-resin matrix material from the sheet 40 and the strip 60, when molten, wells out between the substantially tubular element 30 and end fitting 10a on the one hand, and the heat shrink tape on the other hand, to form a smooth, generally continuous outer shell 86. This shell 86 encapsulates the substantially tubular elements and at least part of the end fitting's undulations. Moreover, these materials form a hardened casing which fills in the annular grooves in the undulated portion of the end fitting 10a, thereby preventing the latter from spreading or sliding out of engagement with the corresponding crests/grooves of the end fitting 10a.

As was noted above, the flat 20a along the side of the end fitting 10a prevents the end fitting 10a from turning within the composite material structure under application of torque. Moreover, axial loads are transmitted directly and efficiently into and out of the load carrying fibers of the fiber-resin matrix.

Figure 17A:
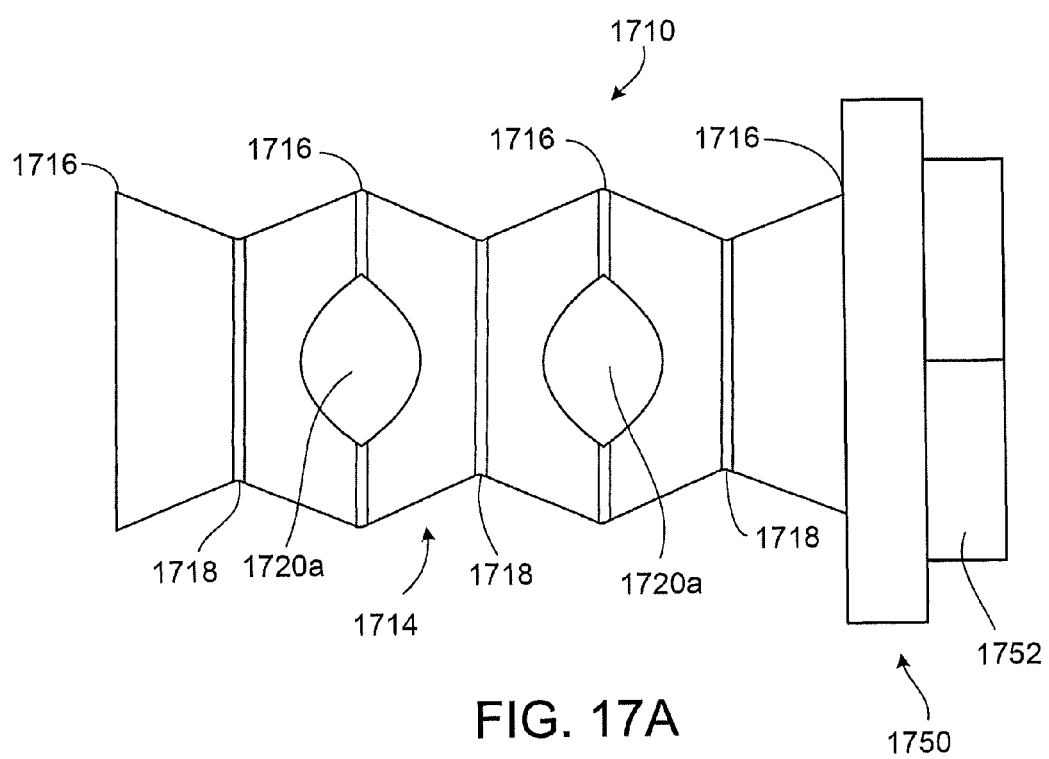
FIG. 17A is a side view of an embodiment of an end fitting.
Figure 17B:
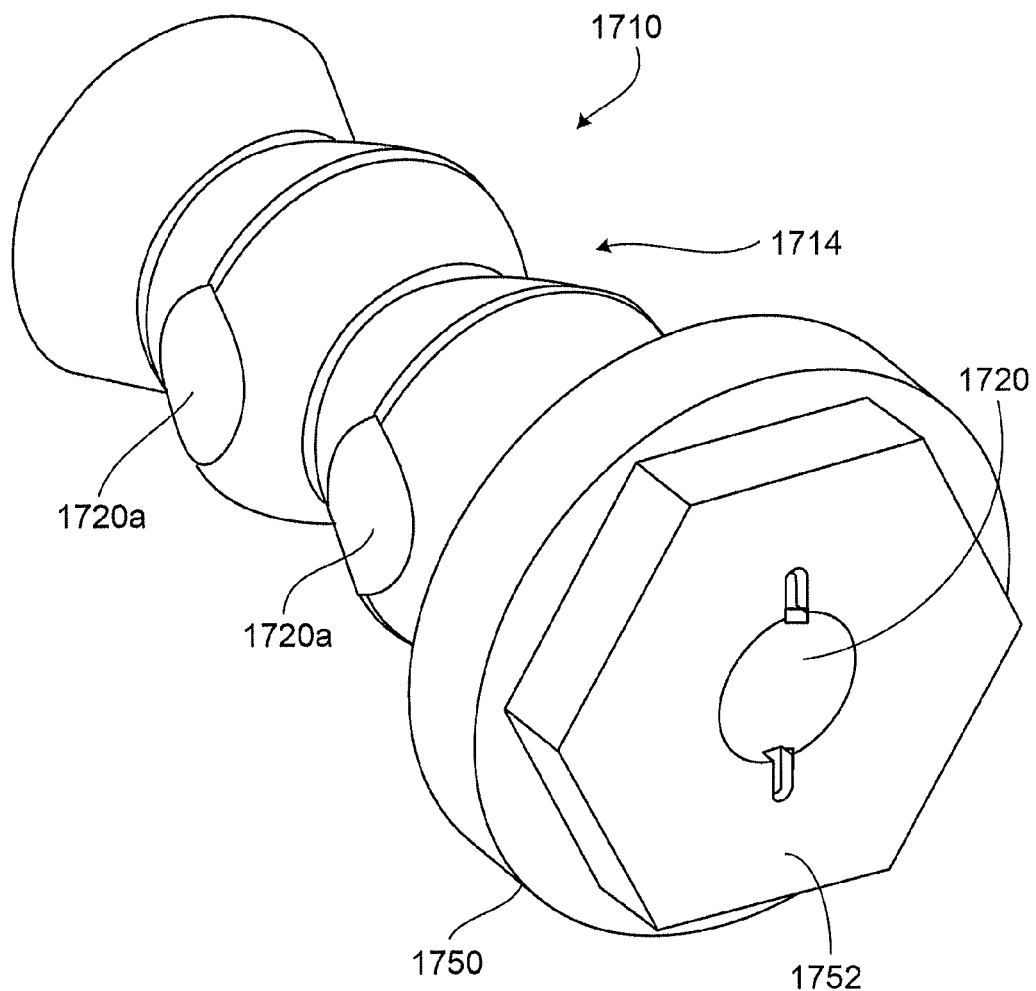
FIG. 17B is a side view of the end fitting of FIG. 17A.

FIG. 17A is a side view showing an embodiment of an end fitting 1710 that can be incorporated in to a composite material structure, such as a strut. FIG. 17B is a perspective view of the end fitting 1710 of FIG. 17A.

The illustrated end fitting 1710 has an undulated outer surface 1714 which defines a plurality of alternating crests 1716 and grooves 1718. At the peak of each crest 1716 and the bottom of each groove 1718 is a transition area, which is slightly rounded, but could alternatively, be substantially flat or be contoured in a variety of different ways. Two of the annular crests have a first flat 1720a on a first side of the end fitting and a second flat (not visible) on an opposite side of the end fitting, so that a series of flats extends along each side of the end fitting. In some implementations, the flats can help prevent or discourage the end fitting from turning within the fiber-resin matrix when a torque is applied thereto.

The end fitting has a collar 1750, with a hexagonal gripping element 1752. An axial bore 1720 extends into the center of the gripping element 1752 and can be configured, for example, to receive the end of a bolt or threaded rod for attachment to another component, such as another strut or a panel.

A number of embodiments of the invention have been described. Nevertheless, it will be understood that various modifications may be made without departing from the spirit and scope of the invention.

For example, some struts may include only one (not two) end fittings.

Additionally, the sheet (and/or strips) of pre-impregnated composite fiber can include lengthwise fibers (i.e., lengthwise relative to the axial length of the substantially tubular element) which extend longitudinally over the end fitting(s) when the sheet has been rolled over the end fitting(s). These lengthwise fibers may help transmit loads to and from the fitting. Additionally, the sheet (and/or strips) of pre-impregnated composite fiber can include crosswise fibers which extend around the end fitting(s) when the sheet has been rolled over the end fitting(s). In a typical implementation, these crosswise fibers can help hold the lengthwise fibers in engagement with the undulations along the end fitting(s).

Additional layers of material and/or other materials may be added to provide or enhance functionality of the strut. The end fittings can be designed for attachment to a variety of external components.

Moreover, the particular steps of the techniques disclosed herein and their order can be changed. In some instances, it may be possible to eliminate one or more steps completely.

The strut disclosed herein may be employed as a structural member in aircraft construction or in other structural applications requiring high strength, light weight and relatively low cost.

Other implementations are within the scope of the claims.

What is claimed is:

1. A method of manufacturing a composite material structure, the method comprising:
    providing a rigid, elongate, non-fluidizable, substantially tubular member;
    coupling a first end fitting to a first axial end of the substantially tubular member, the first end fitting having an undulated outer surface with one or more crests and one or more grooves arranged in an alternating manner, the undulated outer surface extending longitudinally along the first end fitting;
    rolling a sheet of composite material comprising fibers that have been pre-impregnated with a resin material around the substantially tubular member one or more times such that the sheet extends at least partially over the undulated outer surface of the first end fitting;
    applying tape to one or more portions of the rolled sheet only at locations that correspond to the one or more grooves defined by the undulations of the first end fitting;
    removing the tape from the rolled sheet to reveal one or more depressions in an outer surface of the rolled sheet at locations in the rolled sheet that correspond to one or more of the grooves beneath the rolled sheet;
    applying one or more strips of composite material to at least partially cover the one or more depressions;
    applying a shrink tape over the one or more strips and over portions of the rolled sheet that are not covered by the one or more strips and
    curing the composite sheet material and the composite strips.

2. The method of claim 1 further comprising:
    urging the rolled sheet into one or more grooves in the undulated outer surface of the first end fitting.

3. The method of claim 1 further comprising, before the curing step:
    coupling a second end fitting to a second axial end of the substantially tubular member opposite the first axial end, the second end fitting having an undulated outer surface with one or more crests and one or more grooves arranged in an alternating manner, the undulated outer surface extending longitudinally along the second end fitting,
    wherein rolling the sheet onto the substantially tubular member is done in such a manner that the sheet extends at least partially over the undulated outer surface of the second end fitting; and
    urging the rolled sheet into one or more of the grooves in the undulated outer surface of the second end fitting.

4. The method of claim 3 wherein urging the rolled sheet into the one or more grooves of the second end fitting comprises applying tape over at least a portion of the rolled sheet to urge the rolled sheet into the one or more grooves defined by the undulated outer surface of the second end fitting.

5. The method of claim 4 wherein each of the first and second end fittings comprises a substantially cylindrical body and each undulated outer surface comprises a plurality of substantially annular crests and grooves which extend around the substantially cylindrical body.

6. The method of claim 3 wherein the sheet of composite material is wide enough to cover the entire substantially tubular member and at least a portion of the undulated outer surfaces of the first and second end fittings, respectively.

7. The method of claim 3 wherein the substantially tubular member has a first axial opening at the first axial end of the substantially tubular member and a second axial opening at the second axial end of the substantially tubular member, the method comprising:

forming a first extended shoulder on the first end fitting and a second extended shoulder on the second end fitting, the first and second extended shoulders sized to fit snugly into the first and second axial openings, respectively, wherein coupling the first end fitting to the first axial end of the substantially tubular member comprises inserting the extended shoulder into the first axial opening, and coupling the second end fitting to the second axial end of the substantially tubular member comprises inserting the second extended shoulder into the second axial opening.

8. The method of claim 1 wherein the substantially tubular member is a non-fluidizable material.

9. The method of claim 8 wherein the non-fluidizable material is a fiber-reinforced polymer material.

10. The method of claim 8 further comprising:

adhering the sheet to the substantially tubular member prior to rolling the sheet of composite material onto the substantially tubular member.

11. The method of claim 1 wherein the sheet of composite material comprises:

lengthwise fibers which extend longitudinally over the end fitting when the sheet has been rolled onto the substantially tubular member and at least partially over the undulated outer surface of the first end fitting so as to transmit loads to and from the fitting.

12. The method of claim 11 wherein the sheet of pre-impregnated composite fiber further comprises:

crosswise fibers which extend around the end fitting when the sheet has been rolled onto the substantially tubular member and at least partially over the undulations of the first end fitting so as to hold the lengthwise fibers in engagement with the undulated outer surface of the end fitting.

13. The method of claim 1 wherein the composite material is a pre-impregnated composite fiber.

14. The method of claim 1 wherein the composite material structure is a strut.

15. A method of manufacturing a composite material structure, the method comprising:

providing a rigid, non-fluidizable, elongate, substantially tubular member;

coupling a first end fitting formed of non-metallic material to a first axial end of the substantially tubular member, the first end fitting having an undulated outer surface with one or more crests and one or more grooves arranged in an alternating manner, the undulated outer surface extending longitudinally along the first end fitting;

rolling a sheet of composite material around the substantially tubular member so that the sheet covers the substantially tubular member and extends at least partially over the undulated outer surface of the first end fitting;

applying tape to one or more portions of the rolled sheet only at locations that correspond to the one or more grooves defined by the undulations of the first end fitting, removing the tape from the rolled sheet to reveal one or more depressions in an outer surface of the rolled sheet at locations in the rolled sheet that correspond to one or more of the grooves beneath the rolled sheet before curing the composite material;

applying one or more strips of composite material over the rolled sheet to at least partially cover the one or more depressions;

applying a shrink tape over the one or more strips and over portions of the rolled sheet that are not covered by the one or more strips and curing the composite material in the rolled sheet.

* * * * *